3,201,071
TILTING ENGINE AIRCRAFT
Clement de Siebenthal, Le Bosquet, Leysin,
Vaud, Switzerland
Filed Feb. 25, 1964, Ser. No. 347,272
Claims priority, application Switzerland, Feb. 25, 1963,
2,409/63
3 Claims. (Cl. 244—56)

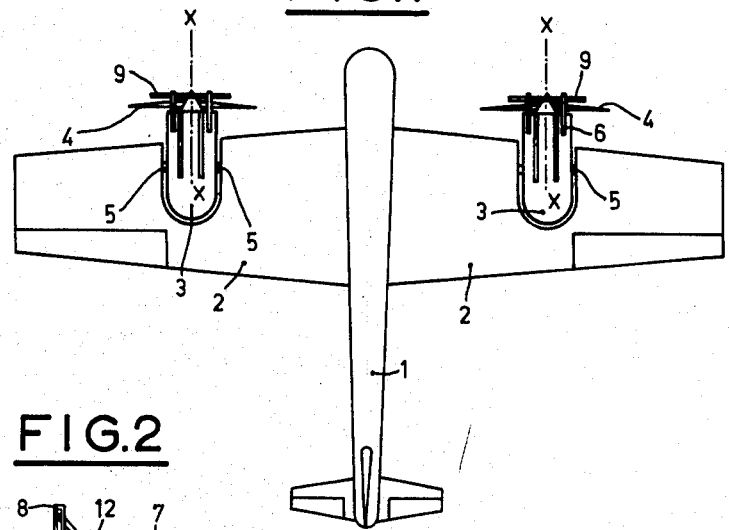
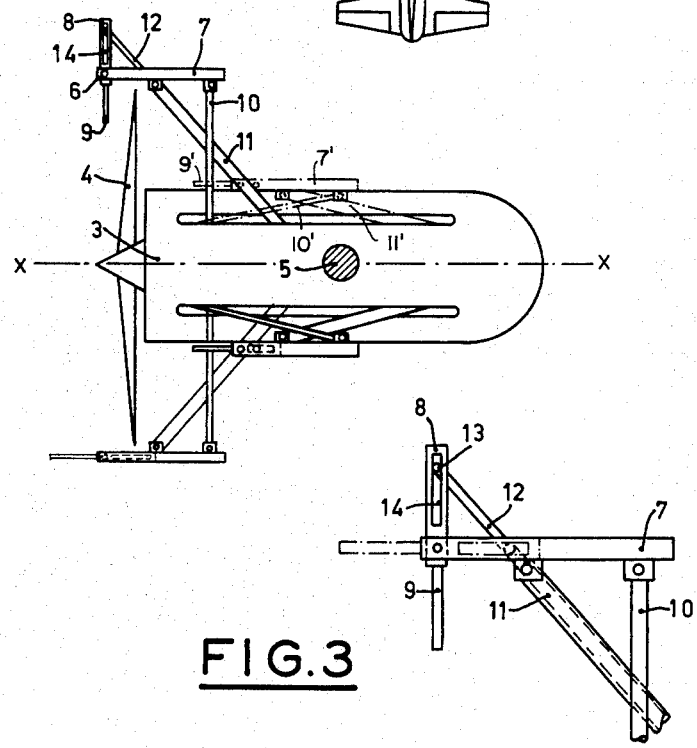

This invention relates to an aircraft designed to take off and to land vertically.

According to the invention there is provided an aircraft having one or more propeller-driving engines, each of which is so pivotally mounted on the aircraft body that it can be rotated between a normal position in which the longitudinal axis of the engine is horizontally disposed and either of two extreme positions in which such longitudinal axis is vertically disposed. Associated with each engine are two screens which are respectively arranged above and below the longitudinal axis of the engine in its normal position and each of which is adapted to be placed in front of a portion of the area swept by the propeller driven by such engine. In connection with each engine, means is provided to selectively project each screen into place and retract each screen from in place in front of the respective swept area portion, with the result that, when one of such screens is so projected while the other screen remains so retracted, the engine is caused to rotate toward one of its two extreme positions and, when the other of such screens is so projected while such one screen remains so retracted, the engine is caused to rotate toward the other of such extreme positions.

The effect of such arrangement is that, on the one hand, when each engine has been rotated to one of such extreme positions, the aircraft is enabled to take off substantially vertically and that, on the other hand, when each engine has been rotated to the other of such extreme positions, the aircraft is enabled to land substantially vertically.

I have illustrated in the accompanying drawings, by way of example, a preferred embodiment of my invention. In said drawings:

FIG. 1 is a plan view of the aircraft,

FIG. 2 is a side-view of a detail of FIG. 1 on a larger scale,

FIG. 3 is a detail of FIG. 2 on a still larger scale,

Figure 4:
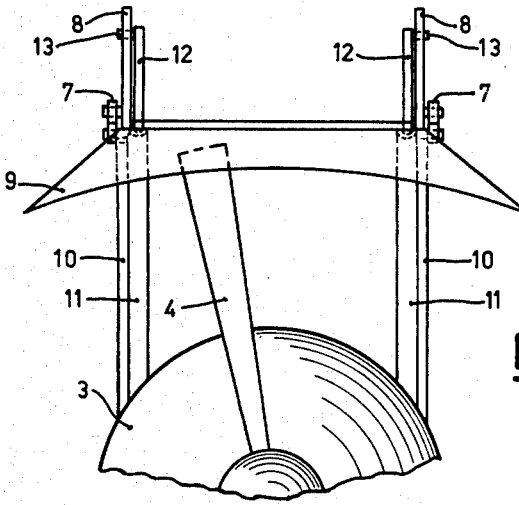
FIG. 4 is a front view corresponding to FIG. 3.
Figure 5:
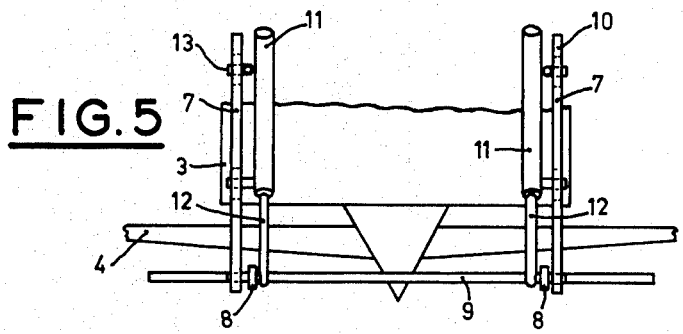
FIG. 5 is a plan view of FIG. 4.

The aircraft illustrated includes a fuselage 1 and two wings 2 carrying each an engine 3 actuating the corresponding propeller 4. The engines 3 are each adapted to pivot around a horizontal axis 5 with reference to the wings 2, said arrangement allowing the longitudinal axes XX of the engines 3 to pivot in vertical planes. Each engine 3 is provided with an upper and a lower movable frame 6, each constituted by two longitudinal parallel bars 7 the front ends of which carry revolvably two pivoting arms 8 carrying a movable screen 9.

Underneath each of the bars 7, are pivotally secured two arms 10 and 11, the free end of the arm 10 being adapted to revolve inside the fairing of the engine 3 while the free end of the arm 11 is adapted to be shifted by a mechanism which is not illustrated, and which is also housed within the fairing of the engine 3. The arm 11 is tubular and houses a rod 12, adapted to slide in said arm and the outer end of which is pivotally secured through the pin 13 with a slider guided inside a groove 14 formed in the arm 8. The other end of the sliding rod 12 is connected with a control system which is not illustrated and is adapted to shift said rod inside the arm 11.

It is possible to control the movements of the screens 9 by means of an electric, hydraulic or mechanical control system, independent of the engine and actuated, for instance, by the pilot. It is also possible to resort to the driving stress of the engines 3 for the actuation of the screens 9, the power being tapped off the engines or the propeller shafts for instance.

The aircraft illustrated possesses the advantage of being able to take off and to land over a very short distance, since the take-off and the landing may be performed even vertically under certain conditions.

These operations are executed as follows:

The aircraft being stationary, and the screens 9 being folded back into contact with the fairing of the corresponding engines 3, the propellers 4 are started rotating. The lower ends of the tubular arms 11 of the frames 6 located above the engines 3, are then shifted towards the front ends of the engines 3. Such a movement produces a pivotal movement of the arms 10 and raises the frames 6 above the propellers 4. At this moment, the sliding rods 12 are actuated so as to make the arms 8 pivot. The latter cause the upper screens 9 to rock, said screens entering then a position to the front of the propellers 4 and reducing consequently the area swept by said propellers and this cuts down the intake of air at the front of the propellers, together with the ejection of air at the rear of the propellers.

As will be appreciated, as the end portion of a given blade of a propeller 4 passes behind the corresponding lowered screen 9, it will produce a traction force less than that normally produced by the blades of such propeller in the absence of such screen. Since the remaining blade or blades of such propeller are still producing such normal traction force, the resulting difference in force appears, with respect to axis 5, as a couple tending to rotate the engine 3 clockwise about such axis 5. When each engine 3 has been so rotated to its extreme vertical position, the corresponding sliding rods 12 are actuated so as to cause, through the arms 8, the associated screen 9 to be retracted away from in front of the area swept by the propeller 4. The aircraft is then in a condition to take off substantially vertically.

When the desired altitude has been attained, the lower screens 9 are caused to be similarly projected into place in front of the respective propellers 4. The resulting difference in traction force, as explained above, again results in a couple, which in this case, however, tends to rotate each engine 3 counter-clockwise about its axis 5. Then, when the engines 3 have been so returned to their normal horizontal position, the lower screens 9 are similarly retracted away from in front of the propellers 4. The engines 3 can be maintained in such horizontal position by means of a suitable locking system.

In landing, the reverse procedure is followed, with the lower screens 9 being projected into place in front of the corresponding propellers 4. The resulting couple rotates each engine 3 counterclockwise with respect to its axis 5 into the opposite extreme vertical position, at which time each respective lower screen 9 is retracted away from in front of the associated propeller 4. With appropriate modification of the pitch of the propellers to obtain adequate braking action, a substantially vertical descent or landing can then be effected. After landing, the engines 3 can be restored to their normal horizontal position by projecting the upper screens 9 into place in front of the propellers 4 in order to create the couple resulting in clockwise rotation of each engine 3 about its axis 5.

The use of the screens 9 allows the engines 3 and the propellers 4 to pivot without any effort which might lead to a breaking of the blades forming said propellers.

The screens 9 may be adapted to operate for any types of propeller-driven aircraft and may be fitted in any suitable manner on the aircraft.

What I claim is:

1. An aircraft comprising a body, an engine pivotally mounted on said body in such a manner that it can be rotated between a normal position in which its longitudinal axis is horizontally disposed and either of two extreme positions in each of which such longitudinal axis is vertically disposed, a propeller driven by said engine, two screens arranged respectively above and below the longitudinal axis of said engine in its normal position and each adapted to be placed in front of a portion of the area swept by said propeller, and means for selectively projecting each screen into place and retracting each screen from in place in front of the respective swept area portion whereby, when one of said screens is so projected while the other screen remains so retracted, the engine is caused to rotate toward one of said two extreme positions and whereby, when said other screen is so projected while said one screen remains so retracted, the engine is caused to rotate toward the other of said two extreme positions.

2. An aircraft according to claim 1, in which said means for selectively projecting and retracting each screen is controlled by said engine.

3. An aircraft according to claim 1, in which said means for selectively projecting and retracting each screen is controlled independently of said engine.

References Cited by the Examiner

UNITED STATES PATENTS

| 1,872,845 | 8/32 | Sullivan | 244—7 |
| 3,029,043 | 4/62 | Churchill | 244—7 |

MILTON BUCHLER, Primary Examiner.

FERGUS S. MIDDLETON, Examiner.